Patented Nov. 23, 1948

2,454,433

UNITED STATES PATENT OFFICE 2,454,433

ACID TREATMENT OF PYRENE-QUINONE VAT DYESTUFFS

John F. Cullinan and Lawrence D. Lytle, Plainfield, N. J., assignors to American Cyanamid Company, New York, N. Y., a corporation of Maine No Drawing. Application March 13, 1944,
Serial No. 526,347

5 Claims. (Cl. 260—362)

This invention relates to an improved process of transforming vat colors into a form having a very fine and substantially uniform particle size.

More particularly, the present invention relates to an improved process whereby dyestuffs in the desired uniform, finely-divided state are obtained from vat dyestuffs which may be characterized by the presence of a dibenzopyrenequinone nucleus such as 3,4,8,9-dibenzpyrene quinone-5,10, its chloro and bromo derivatives, and so forth. A typical illustration of the dyestuffs of the present invention is the dyestuff having the following structural formula:

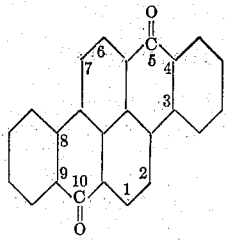

3,4,8,9-dibenzpyrene quinone-5,10

As is well known, vat colors are normally obtained as coarse crystalline materials or as relatively large agglomerated particles. In this state, they are unsuitable for use in printing, pigment dyeing, emulsion printing and the like operations. As a consequence, various procedures have been proposed to reduce their particle-size and thereby improve their penetrating ability and reactivity.

Commercially, the most common of these processes comprises the steps of dissolving the pigment in concentrated sulfuric acid and re-precipitating it by dilution with water, usually by drowning the entire solution in a large excess of water. Modifications have been proposed in which the dilution is carried out in other ways. These have included, for example, addition of dilute sulfuric acid in a quantity only sufficient to precipitate a sulfate which can be collected and hydrolysed; or accomplishing the dilution with water of crystallization by using such hydrated materials as Glauber's salt and the like. The effect of varying the operating temperatures has also been proposed as a means of control.

While the art has succeeded in obtaining finer particle sizes, the importance of uniformity and its necessary relation to fineness was not properly considered. In general, therefore, vat colors as prepared according to the teachings of the prior art generally lacked sufficient uniformity of particle size and contained larger particles in addition to the small ones. As a result, there remained a demand for a method adapted to produce a more finely divided color of more uniform size.

It is, therefore, a principal object of the present invention to develop such a process, capable of producing particles having the desirable properties of fineness and uniformity of particle size. In general, the desired object is accomplished through an improved process of carrying out the treatment of the materials with sulfuric acid.

According to the present invention, it has been found that in the treatment with sulfuric acid, there is for each material a specific range of acid concentrations which produce the optimum result. In addition, it has been found that the proportions between the dissolved and undissolved material at any stage in the process is of equal, if not greater importance. This involves not only the acid concentration, but also the total amount of acid present. Variations also result from changing the temperature at which the reaction is carried out, and to a lesser extent with the time of contact. All must be reasonably controlled for the best results.

In developing the present process, the optimum acid concentratiton and amounts are such that only a very small quantity is dissolved and the dye is precipitated as its sulfate. It is necessary that the dyestuff have some solubility, otherwise it cannot be converted into a sulfate, and it is further necessary that at least one of its sulfates be slightly less soluble. It is the recognition and use of this differential solubility between the dyestuff and its sulfate which is responsible for the surprisingly improved results obtained by the process. The dyestuff, being slightly soluble, goes into a solution as such and is converted to its sulfate. But because the salt is less soluble, the solution becomes supersaturated with respect to the sulfate and the latter separates out.

It should be noted that at any given time the solution of the sulfate is exceedingly dilute. Consequently, the dissolved molecules are relatively far apart and their rate of aggregation in precipitating the insoluble sulfates is very low. At the same time, because the concentration of sulfate remains essentially constant during the entire precipitation, the precipitated products are not only very finely divided but have a very uniform size. Probably due to a pseudomorphosis, this fineness and uniformity is retained when they are subsequently hydrolysed with water, either with or without being previously isolated.

Expressed in general terms, therefore, the process of the present invention comprises the treatment of vat dyestuffs characterized by the presence of a dibenzopyrenequinone nucleus with the correct amount of sulfuric acid having the optimum concentration. At the same time, the proper degree of care is exercised in bringing the acid to the correct concentration before use and in maintaining a substantially uniform temperature throughout the process.

According to the above considerations, the principal factors to be controlled are: (1) the acid concentrations; (2) the amount of acid; (3) the temperature; and (4) the manner of reaching the optimum acid concentration. Each of these has a direct bearing on the treatment of any particular dyestuff. Consequently, each factor is subject to certain limitations.

As far as the acid concentration is concerned, the individual dyestuffs vary widely in their optimum acid ranges. For any particular dyestuff the exact acid range most suitable thereto can not be assigned numerical limitations which will in turn be applicable to all cases. Functionally, a more exact limitation can be assigned in terms of solubility. The lower limit is that acid concentration at which the specific dyestuff has a slight solubility. The upper limit is that concentration at which a sulfate or dyestuff has only a very limited solubility so as to form readily a supersaturated solution of the sulfate.

In treating dibenzopyrene-quinone type dyestuffs according to the process of the present invention, it is important that the sulfuric acid be diluted to the proper concentration before being used. If the dyestuff is dissolved first in concentrated acid and the resultant solution is then diluted to the proper strength, the desirable result is not obtained. In some cases, the dyestuff itself is attacked by the concentrated acid. In other cases, only a coarse material is obtained because precipitation by diluting a rather concentrated solution favors the formation of large particles so that it is desirable to have the initial concentration as low as is practically possible.

So far as the amount of acid used is concerned, at least 90% of the solid products present should remain undissolved at any point in the process. Preferably, the undissolved material should be as great as practically possible so that 98%, or more, remains undissolved. Because the amount of undissolved material present during the process is an important consideration, there is obviously an interrelation between the acid concentration and the amount of acid used. The latter, however, is not as critical as the former. As pointed out above, the amount of acid used may vary. To a certain extent this is limited by practical considerations. Obviously, an insufficient amount of acid produces a very thick, unstirrable slurry. On the other hand, too great an amount of acid is impractical because of the volume required and the consequent decrease in the productive capacity of the equipment. At the same time, too great an amount of acid will dissolve excessive amounts of the dyestuff and sulfate. As was indicated above, this is undesirable if the optimum fineness and uniformity of particle size is to be obtained.

For all practical purposes, the amount of acid used will be found to be about 20 to 40 parts per part of dyestuff. However, in all but extreme cases, these limits can be considerably narrowed. It is usually found that good results will be obtained using between about 20 to 30 parts of acid per part of dyestuff. Because of the relation to the acid concentration, the amount in some cases may require adjustment with respect thereto.

Because in effect, it is the solubilities of the various materials which it is necessary to control, the problem of temperature cannot be overlooked. Marked changes in temperature will alter the solubility of materials in any designated strength of acid. Therefore the temperature of the reaction should not be allowed to vary during the course of the reaction sufficiently to appreciably affect the solubility. It is most convenient to work at approximately room temperature. Consequently, the experimental data taken in developing the present invention is based on temperatures of about 25–35° C. However, it should become desirable to operate at higher or lower temperatures, an adjustment in either or both the strength and amount of acid to compensate therefor can be readily made in accordance with the solubility limitations set forth above.

The time cycle should also be considered. Obviously, if the time of contact is too short, all of the pigment will not be converted into finely-divided sulfate. On the other hand, if the time of contact is unduly prolonged, particles of precipitated sulfate will gradually grow because of the known tendency of crystals to increase in size when maintained in contact with a saturated solution of the mother liquor. There is some interrelation between the time cycle and the acid concentration. However, in the instant invention, this is relatively unimportant since the range of optimum acid concentrations is so close that the time cycle varies but little between the upper and lower limits.

After conversion to the finely-divided sulfate is complete, the dyestuff must be hydrolysed. This may be done either before or after isolation. A good general practice is to drown the slurry in about 4 to 8 times its volume of water. The precipitated product may then be isolated after diluting the solution to a convenient acid strength for practical filtration. Subsequently, the dyestuff is usually washed on the filter until neutral. Preferably, but not necessarily, this washed filter cake is subjected to further treatment with a suitable deflocculating agent.

As an indication of the efficiency of the process, the following test has been found particularly useful. About 100–200 mg. of dispersed dyestuff is suspended in 200 ml. of distilled water at about 50° C. and approximately one-half of this suspension is poured on a three inch conical, glass filter funnel fitted with a dry No. 1 Whatman filter paper. The suspension is allowed to filter by gravity. If the dyestuff is finely divided and uniformly dispersed, most of it should go through the filter into the filtrate, and the residue on the paper should be small.

Test dyeings are then carried out, using the filtrate and the unfiltered portion of the suspension, the strengths of the resultant dyeings being compared. The filtrate of a well-dispersed product gives a dyeing having about 75–90° the strength of the unfiltered product. It is readily apparent that the greatest dye strength from the filtrate is obtained only when the procedure of the present invention has been carried out so as to produce a maximum of finely divided particles of uniform size.

It is surprising, and entirely unexpected, in view of the prior art teaching that the use of more concentrated acids than are indicated by the limits of the present process produces a great amount of coarser particles as shown by the filtration test. Probably it is due to the fact that the strengths of acids usually prescribed by the prior art have too great a solvent action on the dyestuff. As a result the solute molecules are closer together and have a greater chance to precipitate as larger particles of the sulfate. Obviously also, still more concentrated acid will dissolve substantially all the dyestuff, so that the sulfate will be precipitated only after dilution. This is the customary old acid pasting method and subject to all the ordinary faults which have been noted above.

Thus the principal advantage of the present invention lies in its ability to produce very small particles of uniform size. This uniformity of small particle size is of great importance, for example, in a pigment padding process. In such a process, fineness is essential to good penetration but if the particle size is not uniformly small, the coarser particles do not penetrate to the same extent as the finer material and uneven dyeings result. Similarly, in printing vat dyestuffs a fine product size is important in order that reduction may take place quickly but if uniformity is lacking the resultant print is not properly level.

The invention will be more fully illustrated in connection with the following example which is meant to be illustrative only and not by way of limitation. All parts are by weight unless otherwise noted.

Example

One part by weight of the dibenzopyrenequinone of the formula was treated with 25 parts by weight of the sulfuric acid for 18 hours. At an acid strength of 85.7% a uniformly and finely-dispersed product was obtained. When subjected to the filtration test the filtrate showed 90% of the dyeing strength of the unfiltered product. At lower acid strengths of 74.9% and 80% products were obtained the filtration tests of which gave filtrates showing less than 30% dyeing strength as compared with the unfiltered product. Also at the higher acid strength of 89.7% a product was obtained the filtration test of which gave a filtrate showing an exceedingly-low dyeing strength of only 10% of the unfiltered product. The effective range therefore appears to be from about 84–87% sulfuric acid with the optimum somewhere between 85–86%. At these concentrations, the use of about 20–30 parts of acid gave readily workable slurries without exceeding the maximum allowable amount in solution at any one time. The precipitated sulfate is bluish-red. If this same dibenzopyrene-quinone dyestuff is processed by dissolving first in 98% sulfuric acid, diluting the solution later so as to obtain a slurry in the same amount of sulfuric acid of the same concentration as used above under optimum conditions and stirring this slurry for 18 hours, a pigment of far inferior dispersion is obtained. The filtration test gave a filtrate of only 10% dyeing strength of the unfiltered product.

We claim:

1. The method of converting a vat dyestuff, characterized by the presence of a dibenzopyrenequinone nucleus, into very finely divided particles of substantially uniform size which comprises forming a slurry of the dyestuff with 20–40 parts of sulfuric acid of such concentration and under such condition of temperature that at least a part but not more than 10% of the total dyestuff is in solution at any one time, agitating this slurry until conversion of the dyestuff to the substantially insoluble sulfate is substantially complete and hydrolyzing the sulfate to the dyestuff.

2. A method according to claim 1 characterized in that the amount of acid at the concentration used is such that at the reaction temperature not more than 2% of the total dyestuff is in solution at any one time during the operation.

3. A method of converting (3,4,8,9)-dibenzopyrene-quinone-5,10 into very finely divided particles of substantially uniform size which comprises forming a slurry of the dyestuff with 20–30 parts of sulfuric acid of such concentration and under such condition of temperature that at least a part but not more than 10% of the total dyestuff is in solution at any one time, agitating this slurry until conversion of the dyestuff to the substantially insoluble sulfate is substantially complete and hydrolyzing the sulfate to the dyestuff.

4. A method according to claim 3 characterized in that 84–87% sulfuric acid is used in such amount that not more than 2% of the total dyestuff is in solution at any one time during the operation.

5. A method according to claim 3 characterized in that from about 20–30 parts of 84–87% sulfuric acid is used.

JOHN F. CULLINAN.
LAWRENCE D. LYTLE.

REFERENCES CITED

The following references are of record in the file of this patent:

UNITED STATES PATENTS

| Number | Name | Date |
|---|---|---|
| 1,145,934 | Steindorff et al. | July 13, 1915 |
| 1,887,812 | Kunz | Nov. 15, 1932 |
| 2,055,699 | Ogilvie et al. | Sept. 29, 1936 |
| 2,065,928 | Waldron | Dec. 29, 1936 |
| 2,104,960 | Thomson | Jan. 11, 1938 |
| 2,278,973 | Carr | Apr. 7, 1942 |
| 2,353,049 | Pitman | July 4, 1944 |

FOREIGN PATENTS

| Number | Country | Date |
|---|---|---|
| 9,975 | Great Britain | 1914 |
| 313,724 | Germany | Jan. 20, 1921 |
| 502,623 | Great Britain | Mar. 22, 1939 |